(12) United States Patent
Crawford, Jr.

(10) Patent No.: US 9,960,582 B2
(45) Date of Patent: May 1, 2018

(54) TEMPORARY PROTECTIVE JUNCTION BOX COVER

(76) Inventor: McArvie Crawford, Jr., Whittier, CA (US)

(*) Notice: Subject to any disclaimer, the term of this patent is extended or adjusted under 35 U.S.C. 154(b) by 0 days. days.

(21) Appl. No.: 12/217,198

(22) Filed: Jul. 1, 2008

(65) Prior Publication Data

US 2009/0071682 A1  Mar. 19, 2009

Related U.S. Application Data

(60) Provisional application No. 60/958,276, filed on Jul. 2, 2007.

(51) Int. Cl.
*H02G 3/12* (2006.01)

(52) U.S. Cl.
CPC ..................... *H02G 3/12* (2013.01)

(58) Field of Classification Search
CPC .......... H02G 3/12; H02G 3/121; H02G 3/123; H02G 3/14; H01R 13/447; H01R 13/443; H01R 13/46
USPC ..... 174/66, 67, 58, 17 R, 135, 50, 480, 481; 220/3.2, 3.8, 241, 242; 33/DIG. 10, 528; D13/177, 156
See application file for complete search history.

(56) References Cited

U.S. PATENT DOCUMENTS

| | | | | |
|---|---|---|---|---|
| 1,956,196 A * | 4/1934 | Korab | ........................... | 220/3.8 |
| 3,061,083 A * | 10/1962 | Hubbell, Jr. | .................... | 174/50 |
| 3,601,276 A * | 8/1971 | Culpepper | ..................... | 220/3.8 |
| 3,745,664 A * | 7/1973 | Altseimer | ...................... | 220/3.8 |
| 5,063,872 A * | 11/1991 | Maus et al. | ................... | 118/213 |
| 5,526,952 A * | 6/1996 | Green | ............................ | 220/3.8 |
| 6,103,974 A * | 8/2000 | Erdfarb | .......................... | 174/66 |
| 6,653,566 B2 * | 11/2003 | Petak et al. | ..................... | 174/66 |
| 6,686,540 B2 * | 2/2004 | Compagnone, Jr. | ........... | 174/58 |
| 6,906,260 B2 * | 6/2005 | Grendahl | ........................ | 174/66 |
| 6,949,708 B1 * | 9/2005 | Hausen et al. | .................. | 174/66 |
| 7,071,413 B1 * | 7/2006 | Paape | ............................. | 174/66 |
| 7,456,359 B1 * | 11/2008 | Tidd | ............................... | 174/66 |

\* cited by examiner

*Primary Examiner* — Angel R Estrada
(74) *Attorney, Agent, or Firm* — Jason P. Webb; Pearson Butler

(57) ABSTRACT

A temporary protective cover for junction boxes with or without installed switches and/or outlets and for conduit bodies, empty or containing wires or cables of various sizes and uses. The protective cover having a front and rear surface; having a trapezoidal cavity sized to receive installed switches and/or outlets in junction box; the protective cover having two elongated tabs that extend on either side of installed switch or plug inside junction box, for securing the protective cover to junction boxes and conduit bodies; having rectangular or circular cavity opening that is sized to fit openings of junction boxes or conduit bodies, in such a manner that the cover remains fixed relative to the junction box or conduit body.

16 Claims, 10 Drawing Sheets

TEMPORARY PROTECTIVE JUNCTION BOX COVER

CROSS-REFERENCE TO RELATED APPLICATIONS

This application claims the benefit from U.S. Provisional Patent Application No. 60/958,276 filed Jul. 2, 2007, whose contents are incorporated herein for all purposes.

INCORPORATION BY REFERENCE

The present invention relates to temporary protective junction box covers for streamlining the process of covering and protecting different types of junction boxes and their contents from construction materials being applied to the wall or ceiling surface and/or debris. This cover can create further reductions in the time required to cover an uncover junction boxes during the interior and exterior construction process, and help eliminate time spent cleaning or replacing switches, outlets and/or the junction box. These patents are incorporated by reference herein as background information illustrating temporary protective junction box covers. Erdfarb U.S. Pat. No. 6,103,974; Compagone, Jr. U.S. Pat. No. 6,686,540; Green U.S. Pat. No. 5,526,952; disclose various types of temporary protective covers and are also incorporated by reference herein as background information.

BACKGROUND OF THE INVENTION

When applying a finish to an interior wall or exterior wall surface, the electrical junction boxes and their contents must be protected from the material being used. If the opening of the junction box and it's contents are exposed, the contents of the box will be prone to damage from excessive paint, joint compound and/or cement stucco. The conventional solution is to use masking tape to cover the opening, the switch or outlet in the box. Masking tape is difficult to apply over protruding light switches. The method of using masking tape has drawbacks in that if not applied properly it may not protect the switch or outlet itself, or the incoming computer or electrical wires, of from the materials being applied. Some other drawbacks of using masking tape are, that the tape will leave jagged edges when tape is removed from wall and if an excessive amount of material is applied, the tape's glue may become weak and loose it's adhesion to the switch or outlet, thus allowing the applied materials to attach to and/or damaged either the switch, outlet or cover the electrical wires within the box.

When installing conduit there is a need to access and protect the contents of the F.S. Boxes, conduit bodies, and conduit junction boxes. The conventional method is to attach and remove the permanent covers by screws. This temporary cover allows the worker to access the contents inside conduit junction boxes quickly and continues to protect conduit junction boxes while they are being connected to new or existing conduit and/or while surrounding areas are under construction.

There is a need for a simple way to protect switches, outlets, and electrical wires within the junction box during the application of the aforementioned materials and their application processes, that can be attached and removed easily. When it is removed it will leave clean edge between the wall and the interior of the junction box and its contents will be free of physical damage.

BRIEF SUMMARY OF INVENTION

This idea solves the problem of protecting junction boxes on walls under construction, by simply applying pressure simultaneously to the right and left extending side tabs of the cover, while sliding the cover into the junction box and releasing the pressure on the tabs. The extending side tabs fit snugly against the interior sidewalls of the junction box. The trapezoidal shaped rectangular cover is sized to have a cavity large enough to receive an installed light switch or outlet. The top and bottom edges of the cover rest on the exposed rim of the junction box, allowing the cover to protect the box and it's contents.

BRIEF DESCRIPTIONS OF THE DRAWINGS

Figure 4:
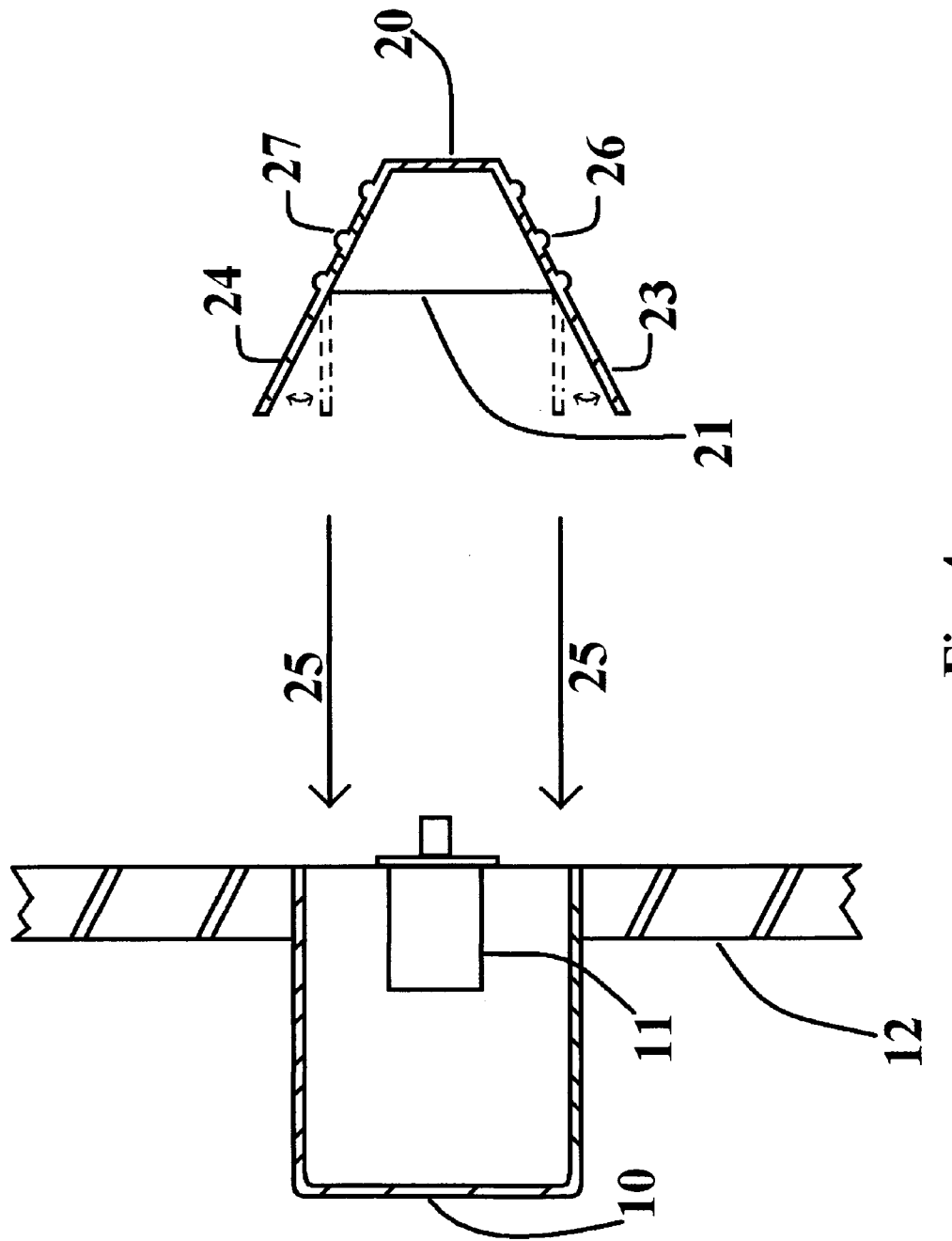

FIG. 4 is a cross-sectional view of wall, junction box, light switch and protective cover. It shows protective cover inserted into junction box, in direction indicated by arrows. It also shows that the extended side tabs will flex, when pressure is applied to extended side tabs simultaneously so protective cover can be inserted into junction box.

Figure 5:
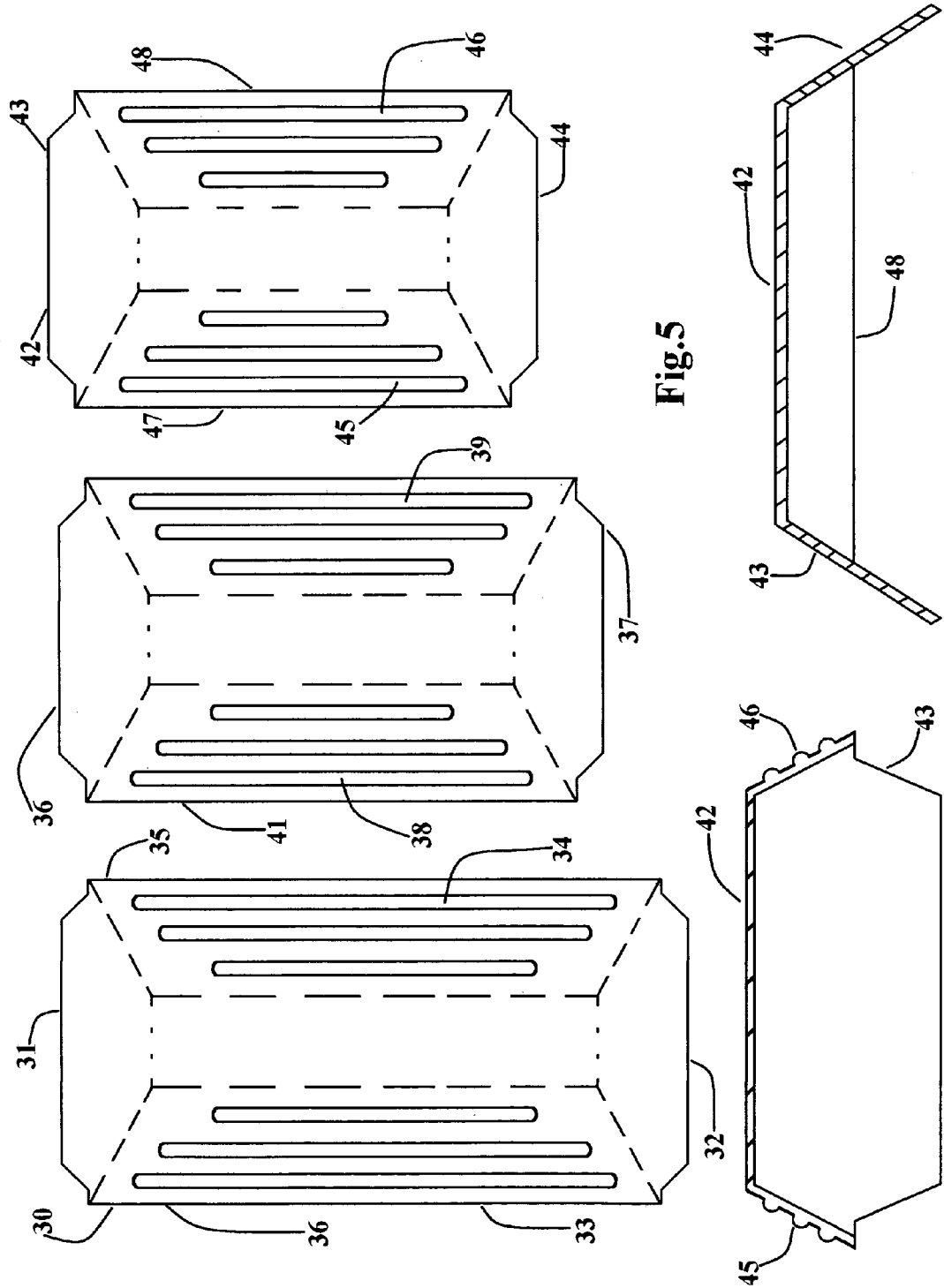

FIG. 5 shows additional embodiments of this invention from the top, front and side cross-sectional views. Embodiments are sized to fit double, triple and quadruple junction boxes.

Figure 6:
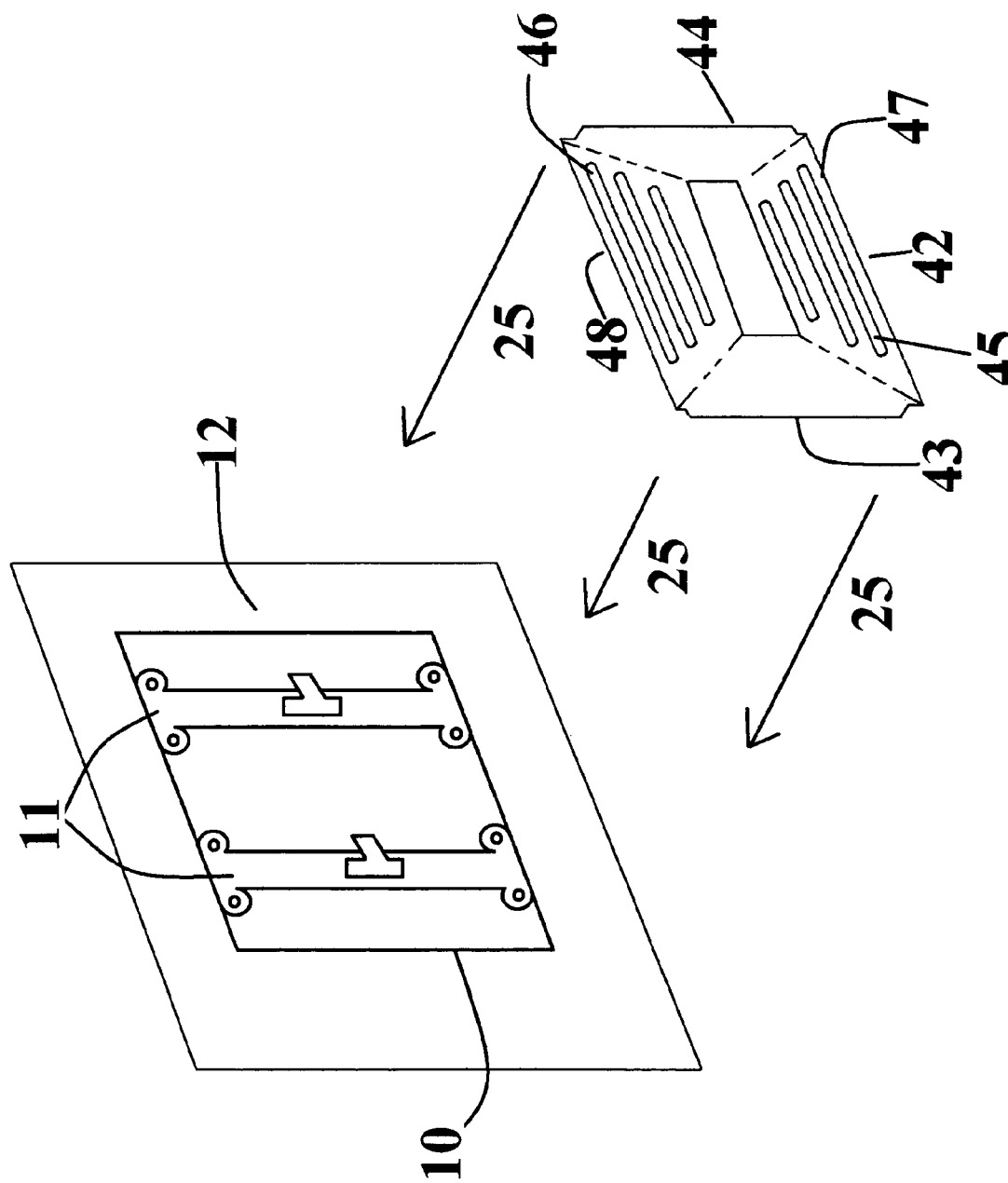

FIG. 6 shows the embodiment and how it's applied to the junction box.

Figure 7:
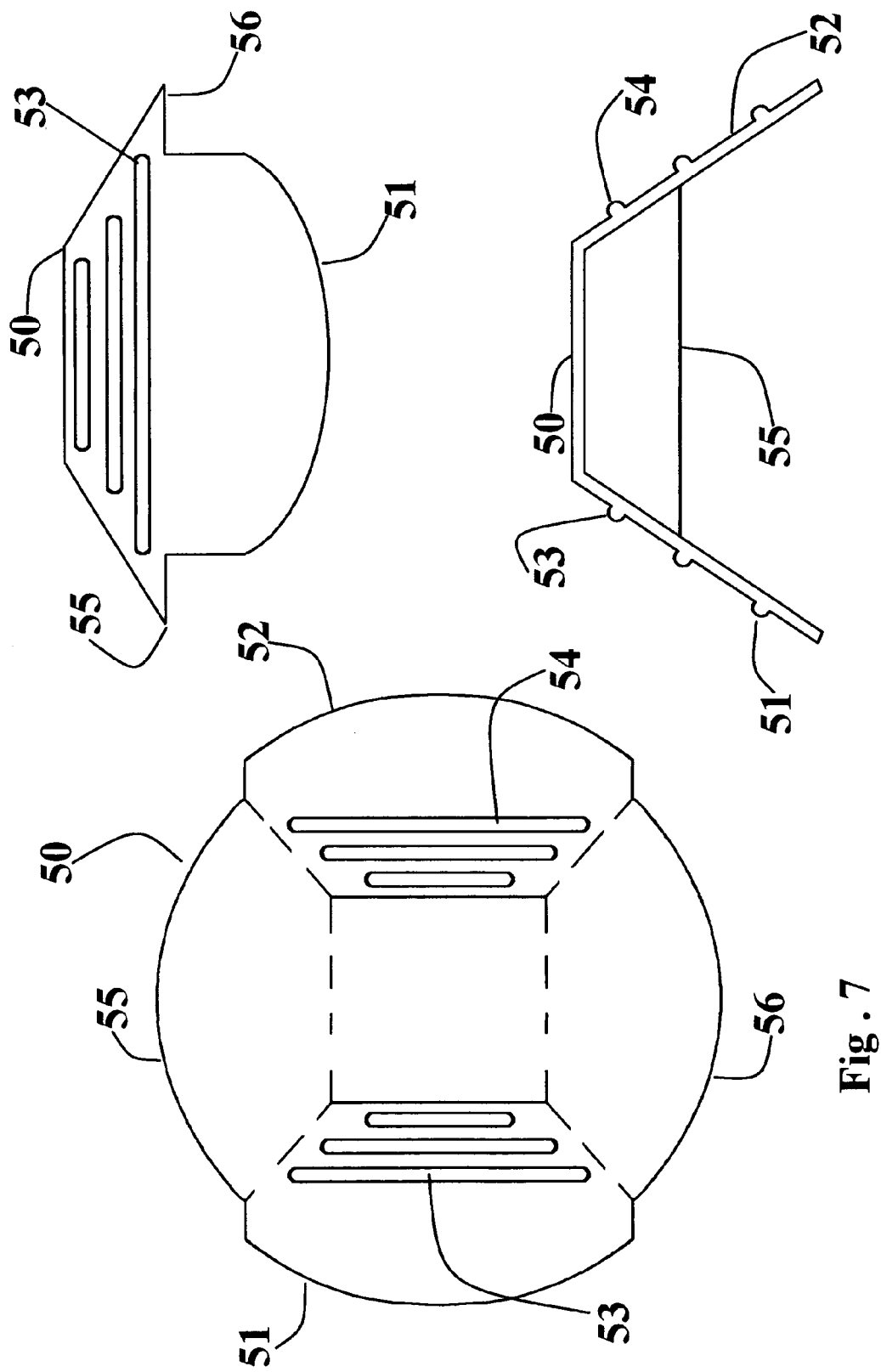

FIG. 7 shows an embodiment of the invention that is for a ceiling box or an circular junction box in top, side view and a cross-sectional view.

Figure 8:
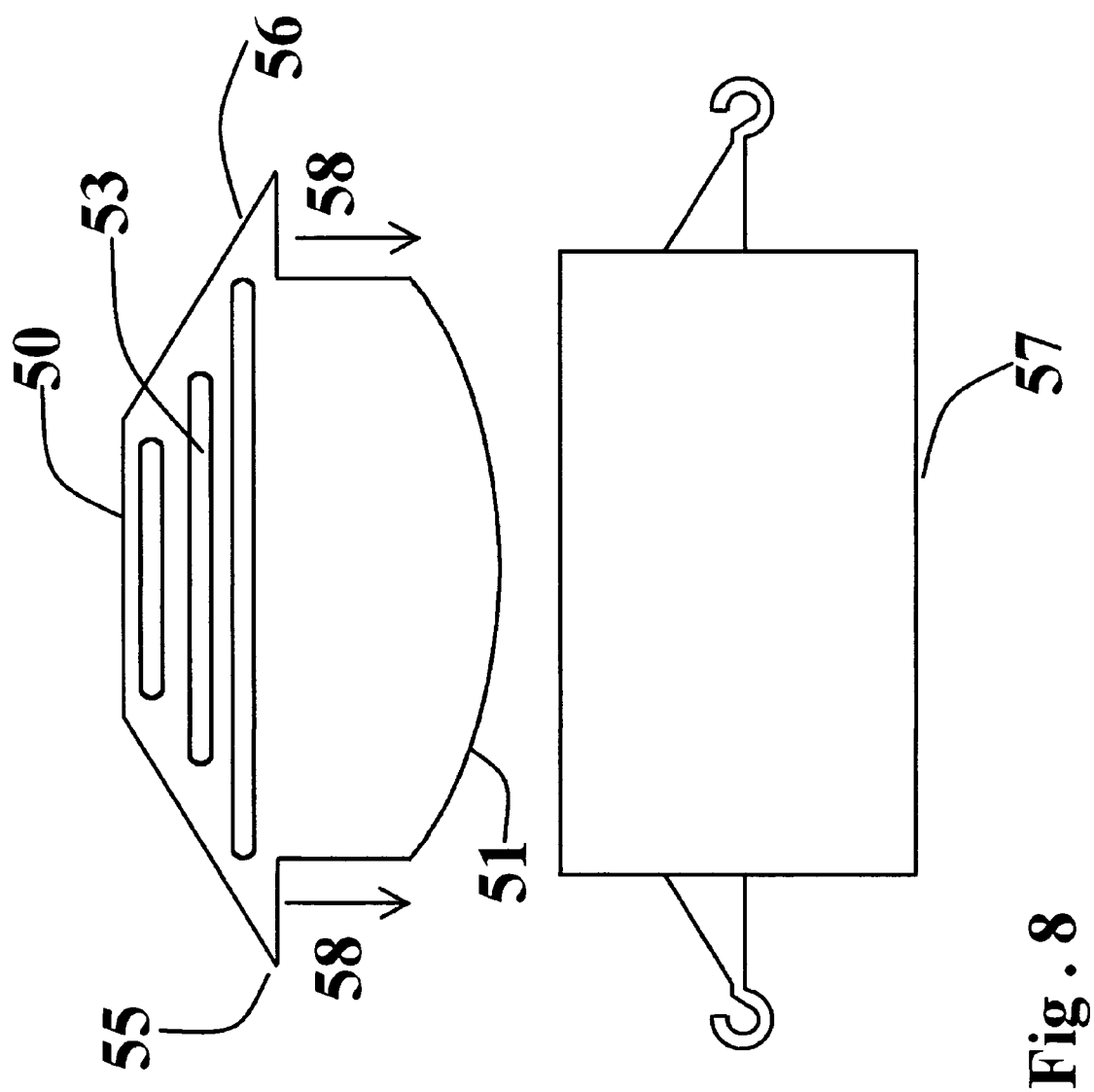

FIG. 8 shows how embodiment fits into round junction box.

Figure 9:
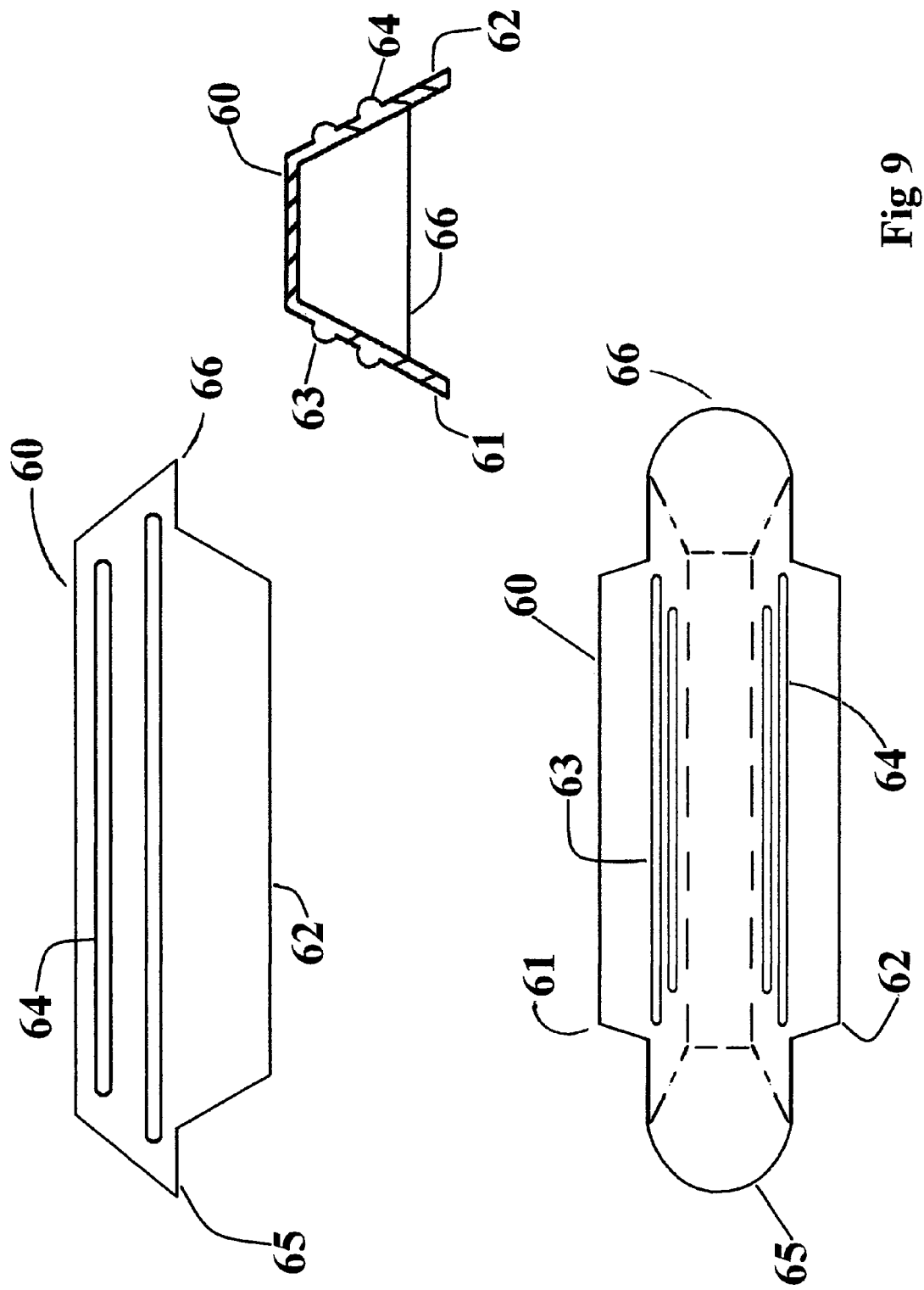

FIG. 9 shows an embodiment of this invention for a conduit body, in a top, side and cross-sectional view.

Figure 10:
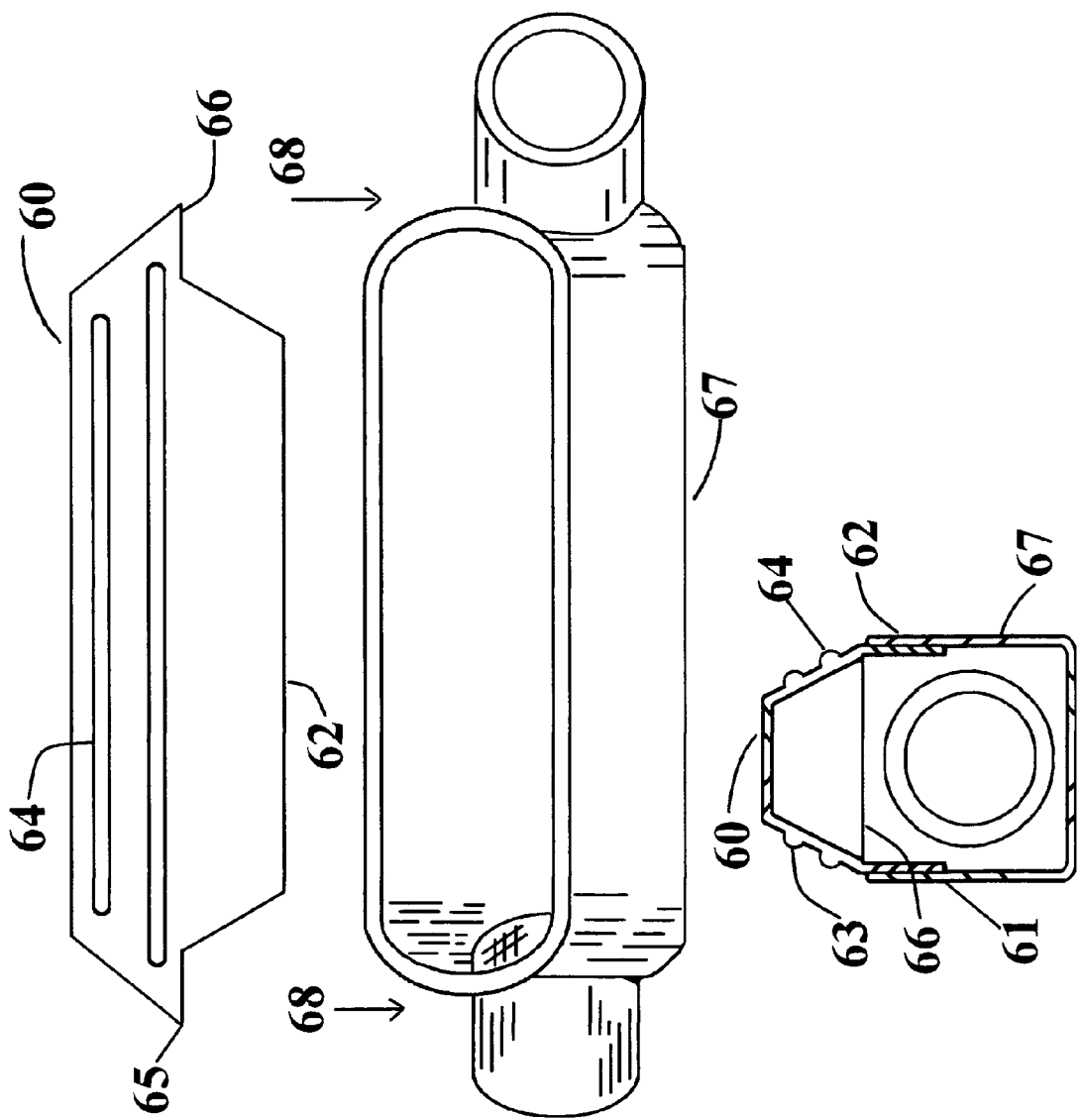

FIG. 10 shows how embodiment fits into conduit body and a cross-sectional of how it fits.

DETAIL DESCRIPTION OF THE DRAWINGS

Figure 1:
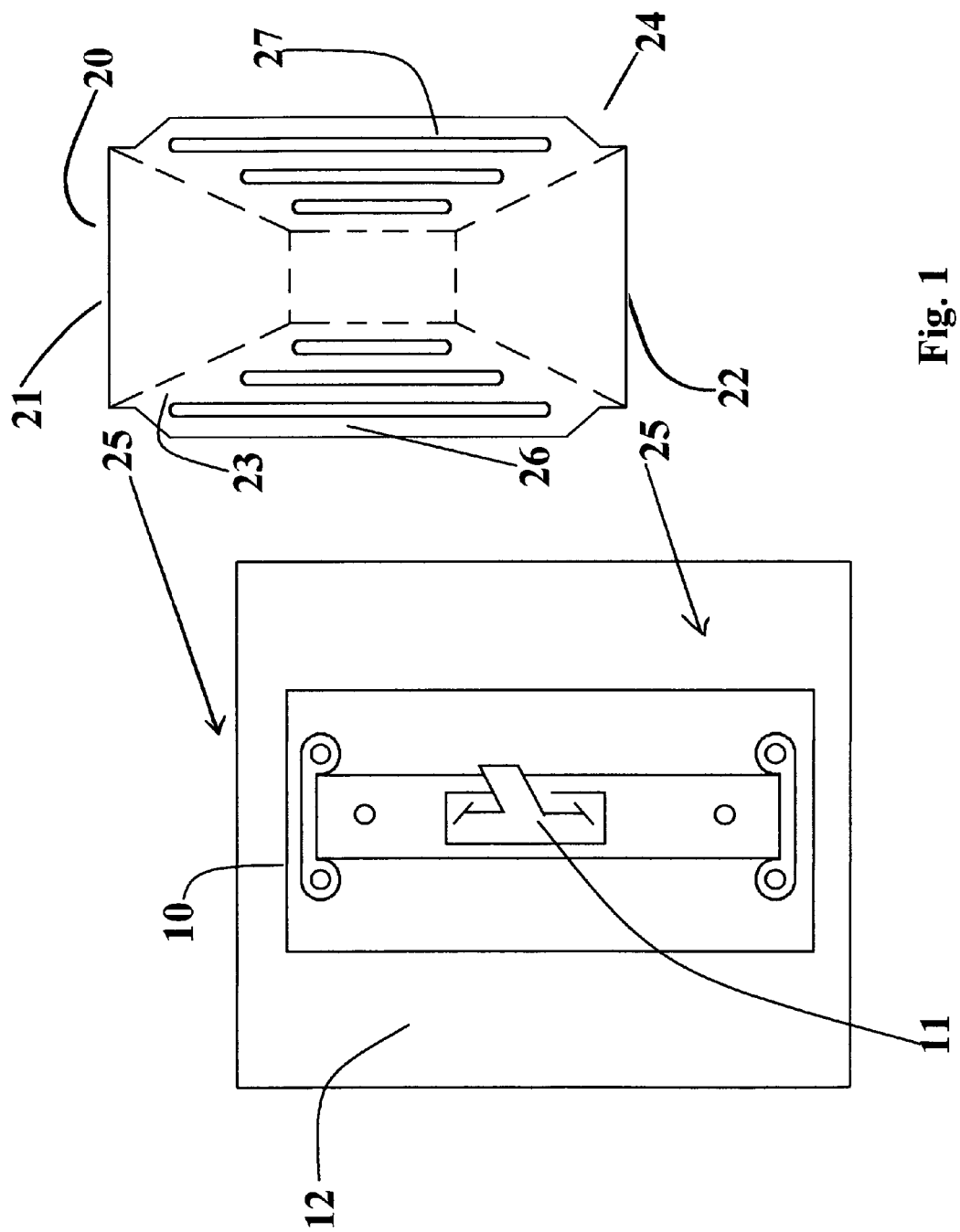
FIG. 1 is a perspective of a wall, junction box, light switch and protective cover.

FIG. 1 is perspective view of the protective cover 20, top and bottom edges 21 and 22, extended side tabs 23 and 24. The embodiment shown is for use with a standard single switch or outlet electrical junction box. Additional sizes can be used to cover double, triple, and quadruple switch and outlet boxes. The trapezoidal portion of 20 forms a cavity deep enough as to allow for the protrusion of a light switch while still having extended side tabs 23 and 24 frictionally contact the interior wall of the electrical junction box. A wall 12, light switch 11, and a junction box 10 are shown. Arrows 25 show how protective cover is inserted into the junction box.

Figure 2:
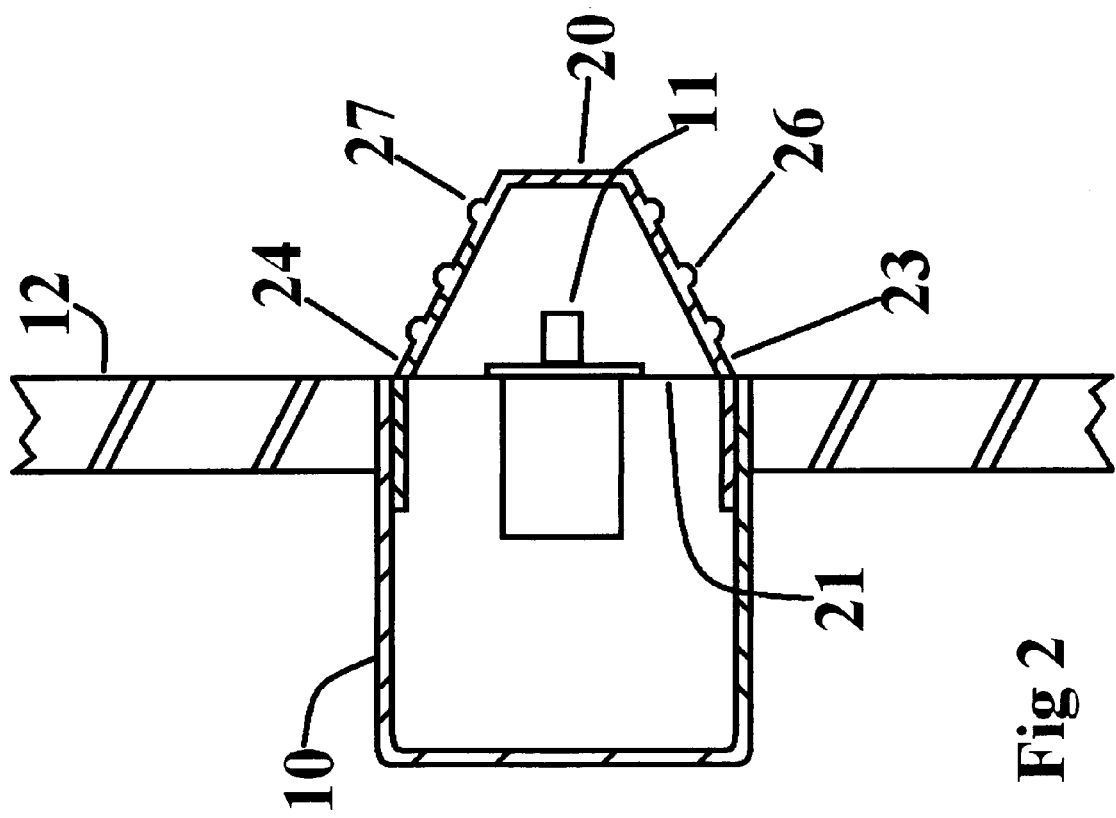
FIG. 2 is a cross-sectional view of the wall, junction box, light switch, and the protective cover inserted into junction box.

FIG. 2 is a cross-sectional view of the protective cover 20 inserted into junction box 10. The extended tabs 23 and 24 fit snugly against interior side walls of junction box 10 without interfering with light switch 11. The trapezoidal portion of 20 has cavity sized to receive the protruding light switch 11, when extended tabs 23 and 24 contact interior walls of 10.

Figure 3:
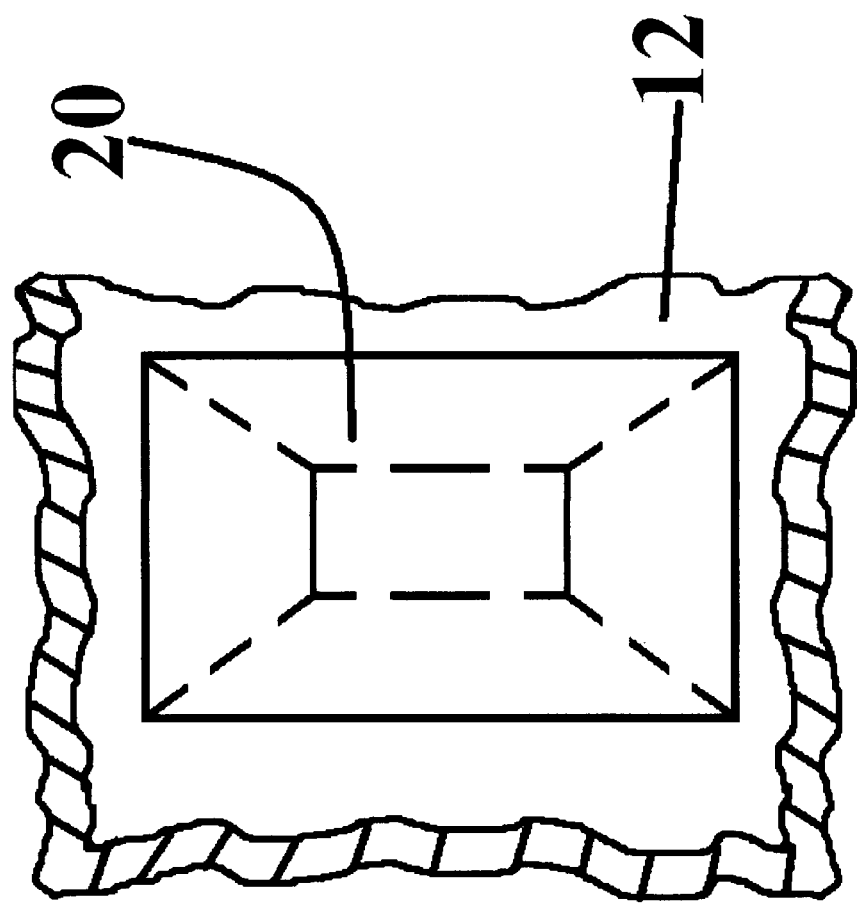
FIG. 3 is a frontal view of protective cover inserted into junction box.

FIG. 3 shows a frontal view of wall 12 and protective cover 20 inserted into electrical junction box 10(not shown).

FIG. 4 shows a cross sectional view of protective cover 20 when the extended side tabs 23 and 24 have pressure applied simultaneously by squeezing the rounded grip ridges 26 and 27, so that protective cover 20 can be inserted (arrows 25) into junction box 10.

FIG. 5 shows a top view, frontal and side cross-sectional views of covers 30, 36 and 42 as embodiments for double, triple, and quadruple protective covers for junction boxes with switches and/or outlets installed inside. Cover 30 is sized to fit a quadruple junction box, cover 36 is sized to fit a triple junction box and cover 42 is sized to fit a double box without detracting from the application of this invention. Top and bottom edges 35, 36, 40, 41, 47 and 48 allow to rest flush on the rim of the junction box. Rounded grip ridges 45, 46, 38, 39, 33, 34 and extended side tabs 31, 32, 37, 38, 43 and 44 allow for covers 30, 36 and 46 to be inserted by the same installation and removal processes as cover 20.

FIG. 6 shows how cover 42 engages the junction box 49 similar to how cover 20 is engaging junction box 10. Covers 36 and 30 engage their respective size junction boxes in the same fashion. Rounded grip edges 45, 46, are located on the same surface as top and bottom edges 47 and 48. The location position of the rounded grip edges on covers 30, 36 and 42 allows these embodiments of cover 20 to be held securely during installation and removal process.

FIG. 7 shows another embodiment of over 20 for standard and custom, round or octagon shaped ceiling boxes without detracting from the application of this invention. Protective cover 50 is shown in a top, side and a cross-sectional view. Similar to cover 20, cover 50 has extended side tabs 51,52, top and bottom edges 55, 56 and rounded grip edges 53, and 54, which allow cover 50 installed and remove in the same methods as cover 20. 53 and 54 are located on the same surface as 51 and 52 similar to cover 20. Cover 50 also has a trapezoidal shaped cavity sized to receive a protruding light switch. The bottom of the extended side tabs 51 and 52 are curved shaped and sized to slide into ceiling boxes when pressure is applied to 51 and 52, similar to 20. The round bottom edges of 51 and 52 allow 50 to fit snug into the junction box when pressure is released.

FIG. 8 shows a side view of how cover 50 would be inserted (arrows 58) into round junction box 57, which is similar to installation cover 20.

FIG. 9 shows another embodiment of this invention for metallic or non-metallic conduit bodies without detracting from the application of this invention. Cover is designed similar to cover 20, having top and bottom edges 65,66, rounded grip edges 63, 64, extended side tabs 61, 62, and having a trapezoidal cavity. Cover 60 is installed and removed by using same procedure for cover 20. Cover 60 is a temporary cover for protecting cables and electrical wires when permanent cover is removed for construction purposes from conduit bodies. Cover 60 is shown in a top, side and cross-sectional view.

FIG. 10 shows how cover 60 would be inserted (arrows 68) into a standard size conduit body 67. Cover 60 is designed similar to cover 20 and fits secure when installed using same procedure as 20.

DETAILED DESCRIPTION OF THE INVENTION

Referring now in greater detail drawings wherein the showings are for the purpose of illustrating preferred embodiments of the invention only, and not for the purpose of limiting the invention.

The first embodiment in accordance with the present invention is shown in FIG. 1-4 and illustrate a temporary outlet cover 20 used to cover a single junction box 10. The outlet cover will be made from a polyethylene material allowing the cover to be durable and reusable.

Cover 30, 36 and 42 are embodiments for quadruple, triple and double junction boxes. Cover 30, and 42 have rounded grip ridges 33, 34, 38, 39, 45 an 46 that are parallel to top and bottom edges 35, 36, 40, 41, 47 and 48 which allows the installer to have a better grip while installing and removing.

Cover 50 is an embodiment of the invention for standard round shaped junction boxes and ceiling boxes. The cover has extended side tabs 51 and 52 are circular shaped at the bottom and when pressure is released from tabs after installing, the tabs have snug fit similar to cover 20. Cover 50 has a trapezoidal cavity sized so it can receive a protruding light switch. The top and bottom edges 55, and 56 sit flush on the exposed rim of the junction box. The cover is easily installed by using the rounded grip ridges 53 and 54 when installing and removing, are used in the same fashion as cover 20.

Cover 60 is an embodiment of the invention for standard shaped conduit bodies. The extended side tabs 61 and 62, the rounded grip ridges 63 and 64, and the top and bottom edges 65 and 66 allow cover to be installed, removed and protect as cover 20.

While only standard sized and shaped junction boxes were used the different covers, the invention of this application can be used in connection with other specialty junction boxes without detracting from the invention of this application.

While considerable emphasis has been placed on the preferred embodiments of the invention illustrated and described herein, it will be appreciated that other embodiments can be made and that many changes of can be made in the preferred embodiments, including equivalents thereof, without departing from the principles of the invention. Accordingly, it is to be distinctly understood that the forgoing descriptive matter is to be interpreted merely as illustrative of the invention and not as a limitation.

What is claimed:

1. A temporary plastic protective cover for an electrical junction box, comprising:
   vertical sidewalls that form a cavity that is sized to enclose a light switch when such extends through an opening of the junction box into the cavity during use, wherein the protective cover is trapezoidal in shape and the cavity's opening is rectangular in shape and size, it is dimensions are substantially similar to the dimensions of the opening of the junction box, and wherein the vertical sidewalls each include a plurality of grip ridges positioned and aligned to provide grip to a hand squeezing the vertical sidewalls simultaneously;
   a plurality of extending side tabs that are adapted to slide into the vertical sidewalls of the junction box and to frictionally engage the sidewalls,
   wherein the plurality of extending side tabs are functionally coupled to the vertical side walls such that when a user squeezes the grip ridges of the vertical side walls, the plurality of extending side tabs rotate inwardly towards the cavity thereby allowing a user to insert or remove the temporary protective plastic cover to or from the junction box.

2. The protective cover of claim 1 wherein rectangular box portion is sized to cover electrical boxes configured to the size of a residential, single or multiple electrical outlet(s) or switch(es).

3. A method of using a temporary protective cover to protect and cover contents of an interior or exterior electrical junction box that rests on the surface or is embedded within a wall surface, comprising the steps of:

providing a temporary protective cover including right and left extended side tabs extending from vertical side walls that each include grip ridges shaped and positioned such that a user simultaneously squeezing opposite grip ridges causes the side tabs to turn inward so they may be inserted to frictionally engage interior walls of junction box;

removing a standard-sized electrical box cover plate, or prior to the installation of electrical cover plate;

squeezing opposite grip ridges thereby causing the side tabs to turn inward; and inserting the extending tabs to frictionally engage interior walls of junction box.

4. A protective cover for an electrical junction box, comprising:

a top edge along a top wall;

a bottom edge along a bottom wall;

a first side tab coupled to the top wall along an edge adjacent to the top edge and to the bottom wall along an edge adjacent to the bottom edge, the first side tab including a first grip ridge protruding from an exterior of the cover;

a second side tab coupled to the top wall opposite the first side tab and coupled to the bottom wall opposite the first side tab, the second side tab including a second grip ridge protruding from the exterior of the cover and positioned opposite the first grip ridge and parallel thereto, wherein either the first and second side tabs extend beyond the top and bottom walls or the top and bottom walls extend beyond the side tabs, thereby forming first and second extending portions that may friction fit into a junction box during use; and a base member coupled to each of the top wall, the bottom wall, the first extended tab and the second extended tab at angles such that:

a cavity is formed therein that is deeper than a width of the base member between the first and second side tabs, the cavity being an interior of the cover, and the first and second extending portions are not parallel with each other.

5. The protective cover of claim 4, wherein the material of the protective cover consists essentially of a flexible material such that simultaneously squeezing the first and second grip ridges causes ends of the first and second side tabs to turn inwardly.

6. The protective cover of claim 4, wherein a height of the trapezoid base between the top and bottom walls is greater than the width of the trapezoid base.

7. The protective cover of claim 4, wherein the top and bottom edges are straight.

8. The protective cover of claim 4, further comprising a plurality of parallel grip ridges in an array on each of the first and second side tabs.

9. The protective cover of claim 8, wherein the plurality of parallel grip ridges are of lengths that increase nearer an edge of each respective side tab.

10. The protective cover of claim 4, wherein the base member is rectangular.

11. The protective cover of claim 4, wherein the grip ridges each extend from near a top of the respective side tab to near a bottom of the respective side tab.

12. The protective cover of claim 4, wherein each of the side tabs completely extend from the top wall to the bottom wall.

13. The protective cover of claim 4, wherein the grip ridges are rounded.

14. The protective cover of claim 4, wherein the cover is shaped to fit over a single, double, triple, or quadruple junction box.

15. The protective cover of claim 4, wherein the material of the protective cover consists essentially of a flexible material such that simultaneously squeezing the first and second grip ridges causes ends of the first and second side tabs to turn inwardly; wherein a height of the trapezoid base between the top and bottom walls is greater than the width of the trapezoid base; wherein the grip ridges each extend from near a top of the respective side tab to near a. bottom of the respective side tab; and wherein each of the side tabs completely extend from the top wall to the bottom wall.

16. The protective cover of claim 9, wherein the material of the protective cover consists essentially of a flexible material such that simultaneously squeezing opposite grip ridges causes ends of the first and second side tabs turn inwardly; wherein a height of the trapezoid base between the top and bottom walls is greater than the width of the trapezoid base; wherein the grip ridges each extend from near a top of the respective side tab to near a bottom of the respective side tab; and wherein each of the side tabs completely extend from the top wall to the bottom wall.

* * * * *